United States Patent
Mongeau et al.

(10) Patent No.: US 10,522,800 B2
(45) Date of Patent: Dec. 31, 2019

(54) VARIABLE VOLUME BATTERY ASSEMBLY

(71) Applicant: FORD GLOBAL TECHNOLOGIES, LLC, Dearborn, MI (US)

(72) Inventors: Michael Peter Mongeau, Farmington Hills, MI (US); Patrick Daniel Maguire, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 897 days.

(21) Appl. No.: 14/609,594

(22) Filed: Jan. 30, 2015

(65) Prior Publication Data
US 2016/0226040 A1    Aug. 4, 2016

(51) Int. Cl.
*H01M 2/10*     (2006.01)
*B60L 50/64*    (2019.01)

(52) U.S. Cl.
CPC .......... *H01M 2/1077* (2013.01); *B60L 50/64* (2019.02); *H01M 2/1083* (2013.01); *H01M 2220/20* (2013.01); *Y02T 10/705* (2013.01); *Y02T 10/7005* (2013.01)

(58) Field of Classification Search
CPC ............ H01M 2/1077; H01M 2/1083; H01M 2220/20
See application file for complete search history.

(56) References Cited

U.S. PATENT DOCUMENTS

| | | | |
|---|---|---|---|
| 5,746,064 A | * | 5/1998 | Tsenter ................ F25B 17/12 165/104.12 |
| 8,329,327 B2 | | 12/2012 | Christensen et al. |
| 8,647,758 B2 | | 2/2014 | Kritzer et al. |
| 2002/0098410 A1 | * | 7/2002 | Leysieffer ........... H01M 2/0207 429/61 |
| 2010/0190047 A1 | | 7/2010 | West et al. |
| 2011/0159352 A1 | | 6/2011 | Culver et al. |
| 2012/0244393 A1 | | 9/2012 | Stanek et al. |
| 2012/0321919 A1 | * | 12/2012 | Schaefer ............... H01M 2/021 429/50 |
| 2014/0093751 A1 | * | 4/2014 | Schaefer ............ H01M 2/1072 429/7 |
| 2014/0170446 A1 | * | 6/2014 | Elian ..................... G01M 3/227 429/61 |
| 2014/0263315 A1 | | 9/2014 | Nelson |

FOREIGN PATENT DOCUMENTS

| | | | | |
|---|---|---|---|---|
| JP | 1997-017400 | * | 1/1997 | ............. H01M 2/02 |
| JP | 1997-139216 | * | 5/1997 | ............. H01M 6/16 |
| JP | 2000-100473 | * | 4/2000 | ............ H01M 10/40 |
| WO | 2014075038 A1 | | 5/2014 | |

* cited by examiner

*Primary Examiner* — Osei K Amponsah
(74) *Attorney, Agent, or Firm* — David B. Kelley; Carlson, Gaskey & Olds (57) ABSTRACT

A battery assembly according to an exemplary aspect of the present disclosure includes, among other things, an enclosure assembly defining an interior and a variable volume device integrated into a wall of the enclosure assembly and configured to modify a volume of the interior.

9 Claims, 6 Drawing Sheets

VARIABLE VOLUME BATTERY ASSEMBLY

TECHNICAL FIELD

This disclosure relates to a battery assembly for an electrified vehicle. The battery assembly includes an enclosure assembly that defines an interior. A variable volume device is integrated into a wall of the enclosure assembly and is configured to modify a volume of the interior of the battery assembly.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on the internal combustion engine to drive the vehicle.

High voltage battery assemblies are employed to power the electric machines of electrified vehicles. The battery assemblies include battery arrays constructed of a plurality of battery cells. An enclosure assembly that often includes a tray and a cover houses the battery arrays. The enclosure assembly must be sealed and vented to prevent moisture from accumulating within the interior of the battery assembly. As governed by the Ideal Gas Law (PV=nRT), temperature fluctuations inside the battery assembly can create pressure differentials between the battery interior and surrounding atmosphere. These pressure differentials may create a vacuum that draws moisture and dust into the battery interior.

SUMMARY

A battery assembly according to an exemplary aspect of the present disclosure includes, among other things, an enclosure assembly defining an interior and a variable volume device integrated into a wall of the enclosure assembly and configured to modify a volume of the interior.

In a further non-limiting embodiment of the foregoing battery assembly, the interior accommodates a plurality of battery internal components.

In a further non-limiting embodiment of either of the foregoing battery assemblies, the enclosure assembly includes a tray and a cover.

In a further non-limiting embodiment of any of the foregoing battery assemblies, the wall is part of the tray and the variable volume device is integrated as part of the tray.

In a further non-limiting embodiment of any of the foregoing battery assemblies, the wall is part of the cover and the variable volume device is integrated as part of the cover.

In a further non-limiting embodiment of any of the foregoing battery assemblies, at least one battery array is housed within the interior.

In a further non-limiting embodiment of any of the foregoing battery assemblies, the variable volume device includes a flexible membrane.

In a further non-limiting embodiment of any of the foregoing battery assemblies, the flexible membrane is movable toward a first position to decrease the volume of the interior and is movable toward a second position to increase the volume of the interior.

In a further non-limiting embodiment of any of the foregoing battery assemblies, the variable volume device includes a flexible membrane that is mounted within a window of the wall.

In a further non-limiting embodiment of any of the foregoing battery assemblies, a cap is mounted to an external surface of a mounting surface of the wall, the cap covering the flexible membrane.

In a further non-limiting embodiment of any of the foregoing battery assemblies, a cap is mounted to an internal surface of a mounting surface of the wall, the cap covering the flexible membrane.

In a further non-limiting embodiment of any of the foregoing battery assemblies, the variable volume device includes an elastomeric membrane.

In a further non-limiting embodiment of any of the foregoing battery assemblies, the variable volume device includes a liquid reservoir.

In a further non-limiting embodiment of any of the foregoing battery assemblies, the liquid reservoir contains a fluid that is displaceable between a first chamber and a second chamber to modify the volume of the interior.

In a further non-limiting embodiment of any of the foregoing battery assemblies, the battery assembly is mounted within an electrified vehicle.

A method according to another exemplary aspect of the present disclosure includes, among other things, balancing a pressure differential between an interior of a battery assembly and atmosphere external to the battery assembly with a variable volume device that is integrated as part of an enclosure assembly of the battery assembly.

In a further non-limiting embodiment of the foregoing method, the variable volume device includes a flexible membrane integrated into a wall of the enclosure assembly.

In a further non-limiting embodiment of either of the foregoing methods, the method includes moving the flexible membrane toward a first position to decrease a volume of the interior or moving the flexible membrane toward a second position to increase the volume of the interior.

In a further non-limiting embodiment of any of the foregoing methods, the variable volume device includes a liquid reservoir and comprising displacing a fluid between a first chamber and a second chamber to modify a volume of the interior.

In a further non-limiting embodiment of any of the foregoing methods, the variable volume device includes an elastomeric membrane and comprising flexing the elastomeric membrane toward the interior to decrease a volume of the interior or flexing the elastomeric membrane away from the interior to increase the volume of the interior.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a battery assembly for electrified vehicles. The battery assembly includes an enclosure assembly that defines an interior. The enclosure assembly may house one or more battery arrays that include a plurality of battery cells. A variable volume device is integrated into a wall of the enclosure assembly. The variable volume device is configured to modify a volume of the interior, thereby balancing a pressure differential between the interior of the battery assembly and atmosphere external to the battery assembly. These and other features are discussed in greater detail in the following paragraphs of this detailed description.

Figure 1:
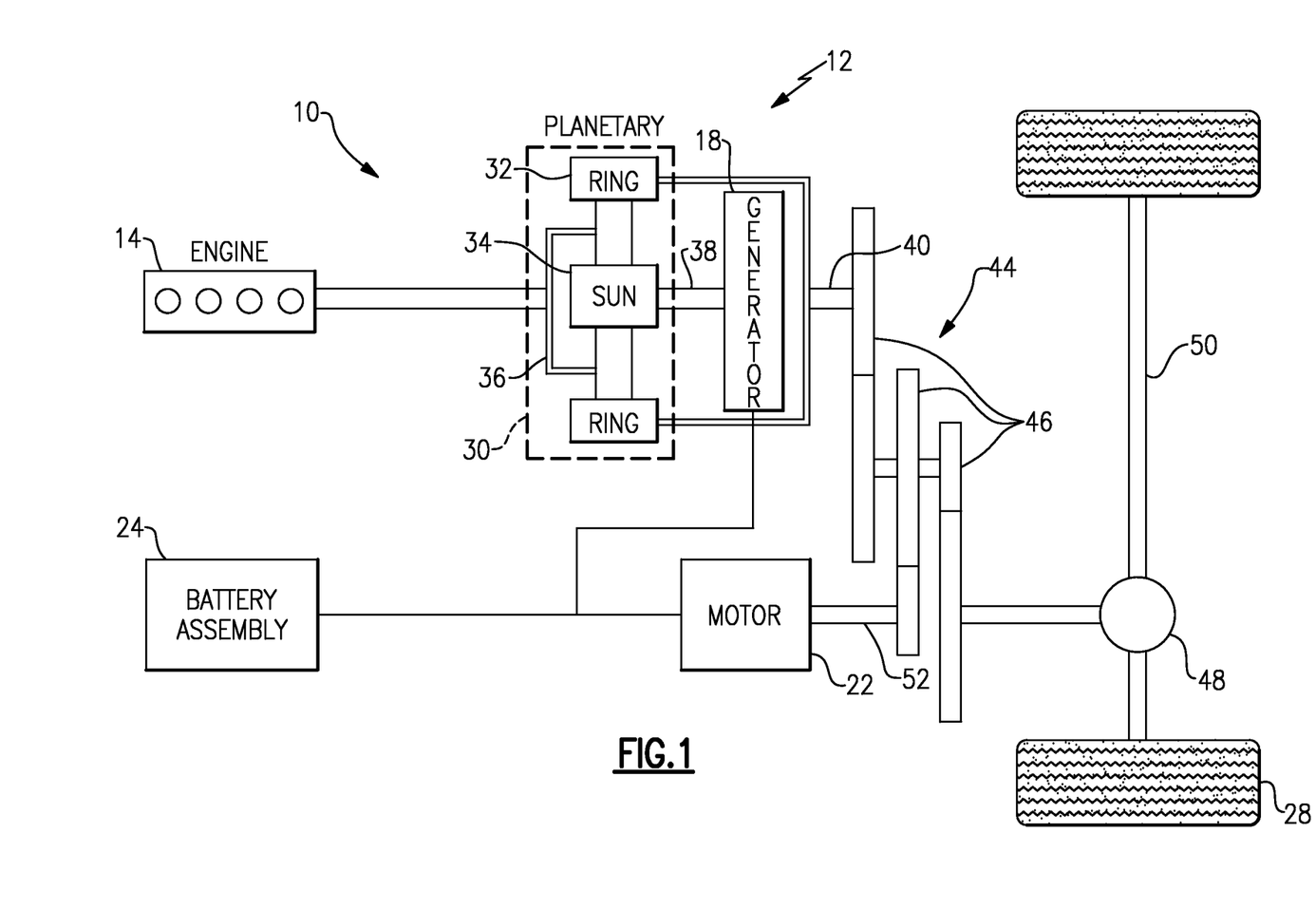
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's) and battery electric vehicles (BEV's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery. The battery assembly 24 may include a high voltage traction battery pack that includes a plurality of battery arrays capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
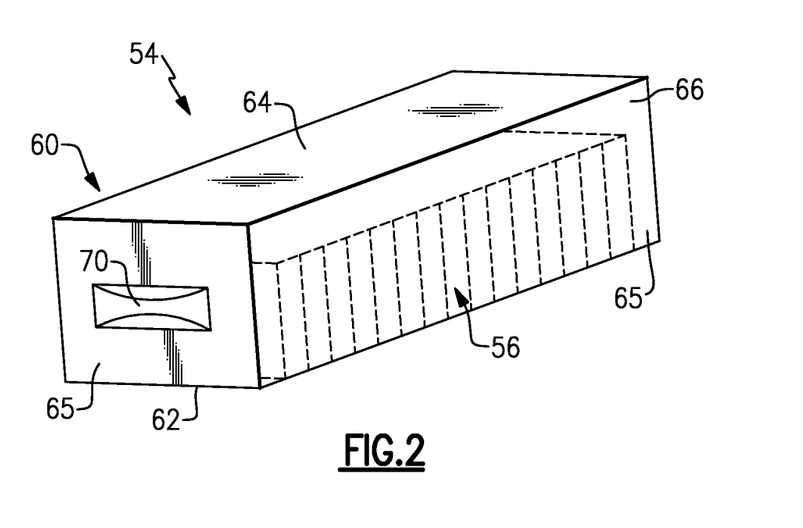
FIG. 2 illustrates a battery assembly of an electrified vehicle.
Figure 3:
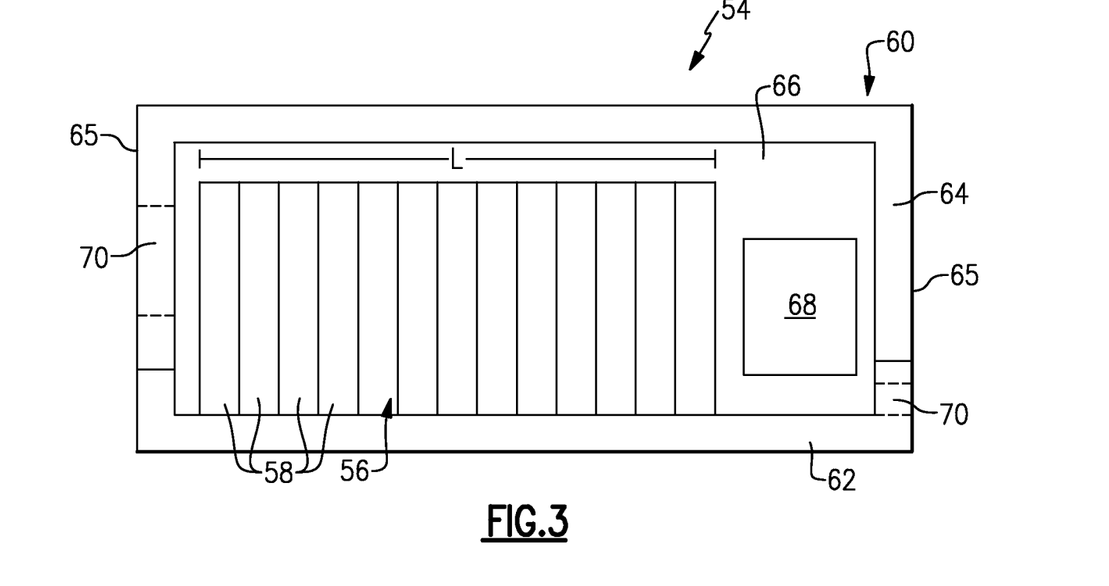
FIG. 3 illustrates a cross-sectional view of the battery assembly of FIG. 2.

FIGS. 2 and 3 illustrate a battery assembly 54 that can be incorporated into an electrified vehicle. For example, the battery assembly 54 could be employed within the electrified vehicle 12 of FIG. 1. The battery assembly 54 includes a battery array 56 (i.e., a grouping of battery cells) for supplying electrical power to the components of an electrified vehicle. Although a single battery array 56 is illustrated in FIGS. 2 and 3, the battery assembly could include multiple battery arrays 56 within the scope of this disclosure. In other words, this disclosure is not limited to the specific configuration shown in FIGS. 2 and 3.

The battery array 56 includes a plurality of battery cells 58 that may be stacked side-by-side along a span length L of the battery array 56 (see FIG. 3). Although not shown, the battery cells 58 may be electrically connected to one another using bus bar assemblies. In one embodiment, the battery cells 58 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

The battery assembly 54 may additionally include an enclosure assembly 60 that defines an interior 66 for housing the battery internal components, such as the battery array 56. The enclosure assembly 60 may also surround one or more electronic components 68 (see FIG. 3). The electronic components 68, shown schematically, may include one or more of a battery energy control module (BECM), a bussed electrical center (BEC) and a service disconnect, among other components. In one non-limiting embodiment, the enclosure assembly includes a tray 62 and a cover 64 which establish a plurality of walls 65 that surround the interior 66.

A variable volume device 70 may be integrated into one or more of the walls 65 of the enclosure assembly 60. In this disclosure, the term "integrated" means the variable volume device 70 is part of the wall(s) 65 rather than being inside or outside of the interior 66 of the enclosure assembly 60. In one non-limiting embodiment, the variable volume device 70 is integrated as part of the tray 62 of the enclosure assembly 60. In another embodiment, the variable volume device 70 is integrated as part of the cover 64 of the enclosure assembly 60. It should be understood that the variable volume device 70 may be integrated into any wall 65 (or multiple walls) of the enclosure assembly 60.

The variable volume device 70 is designed to provide for a variable volume change given a sealed battery assembly 54. For example, the variable volume device 70 may modify a volume of the interior 66 to balance a pressure differential between the interior 66 and atmosphere outside of the battery assembly 54. A zero gauge pressure differential between the atmosphere and the interior 66 is desired to avoid creating a vacuum that could draw moisture, dust, debris and/or other unwanted substances into the interior 66 of the battery assembly 54, or a pressure differential that deflects the enclosure assembly 60 toward components inside or outside the battery assembly 54.

Figure 4A:
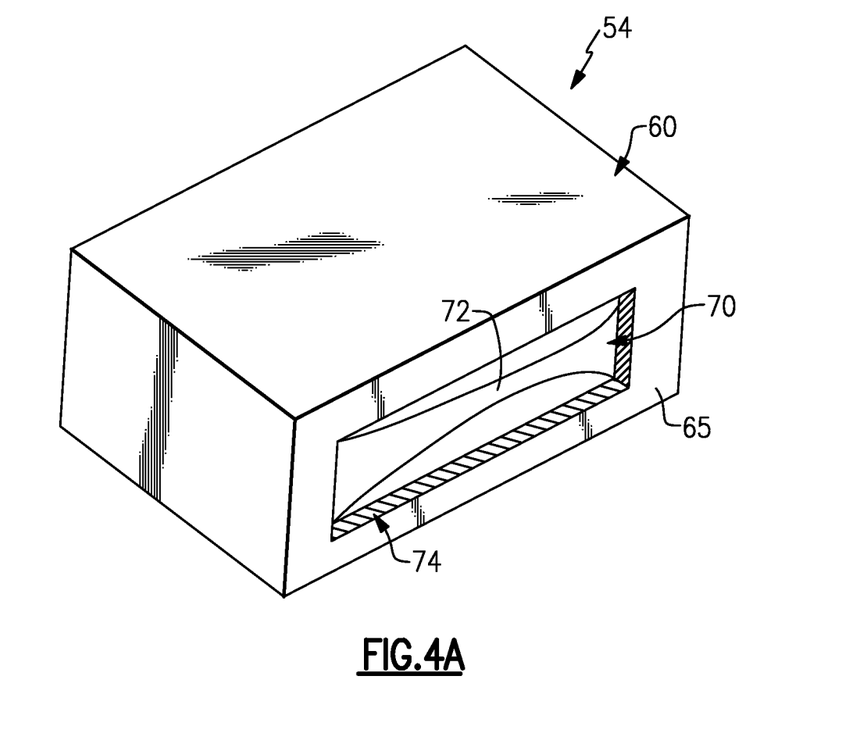
FIGS. 4A and 4B illustrate a variable volume device according to a first embodiment of this disclosure.
Figure 4B:
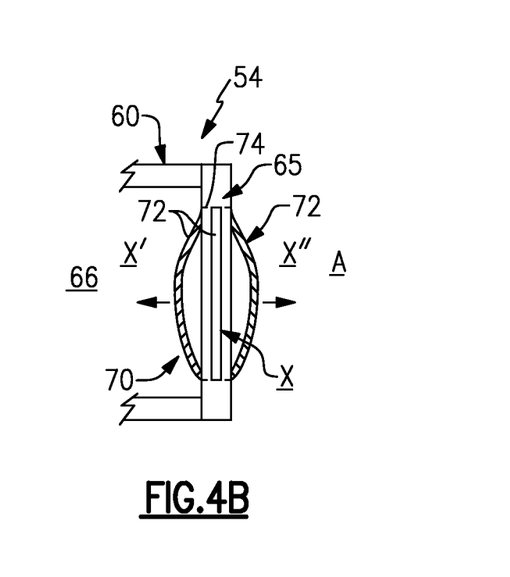

Referring to FIGS. 4A and 4B, the variable volume device 70 may include a flexible membrane 72. The flexible membrane 72 may be mounted in a window 74 of the wall 65 of the enclosure assembly 60. In one embodiment, the flexible membrane 72 is made of a polymeric material. The polymeric material may be selected based on the operational life of the variable volume device 70, which could depend on the estimated number of cycles and the amount of movement the flexible membrane 72 is likely to flex in response to pressure fluctuations within the battery assembly 54.

In one embodiment, as best illustrated in FIG. 4B, the flexible membrane 72 of the variable volume device 70 is movable to modify a volume of the interior 66 of the battery assembly 54 to balance a pressure differential between the interior 66 and surrounding atmosphere A. For example, the flexible membrane 72 may move from a free state X toward a first position X' (i.e., in a direction toward the interior 66) in response to a decrease in the internal pressure of the battery assembly 54 relative to the surrounding atmosphere A. Movement toward the first position X' reduces the volume of the interior 66. Alternatively, in response to an increase in the internal pressure of the battery assembly 54 relative to the surrounding atmosphere A, the flexible membrane 72 may move toward a second position X" (i.e., in a direction away from the interior 66). Movement toward the second position X" increases the volume of the interior 66. It should be understood that the flexible membrane 72 is movable to any position between the first position X' and the second position X" by means of elastic deformation. As the flexible membrane 72 flexes, the surface area of the flexible membrane 72 increases. The volumetric difference between the first position X' and the second position X" may be predetermined based on the expected ranges of pressures and temperatures the battery assembly 54 is designed for and the amount of gas (e.g., air) that will be present inside the battery assembly 54 once sealed.

Figure 5:
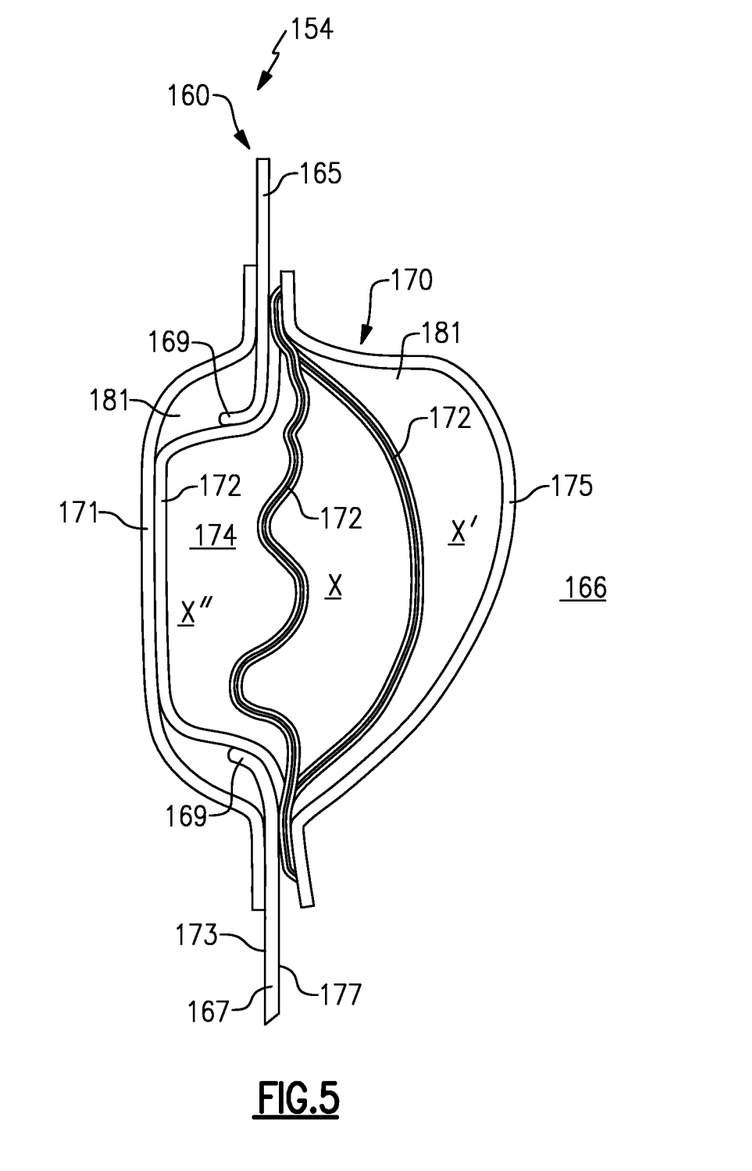
FIG. 5 illustrates a variable volume device according to a second embodiment of this disclosure.

FIG. 5 illustrates another variable volume device 170 for use within a battery assembly 154. In this disclosure, like reference numbers designate like elements where appropriate and reference numerals with the addition of 100 or multiples thereof designate modified elements that are understood to incorporate the same features and benefits of the corresponding original elements. In this embodiment, a wall 165 of an enclosure assembly 160 of the battery assembly 154 includes a mounting surface 167. A window 174, or opening, is formed through the mounting surface 167. A flexible membrane 172 may be mounted within the window 174. The flexible membrane 172 may be mounted in any manner, including but not limited to, pinched, adhered, glued, welded, molded, etc.

The mounting surface 167 of the wall 165 may include a flange 169 that extends around the perimeter of the window 174. In one embodiment, the flange 169 is curved to establish a "friendly edge" around the perimeter of the window 174. The "friendly edge" excludes sharp edges that could damage the flexible membrane 172. The "friendly edge" also helps reduce any potential stress risers that may lead to failure of the flexible membrane 172, and thus a similar radiused flange may be employed on the interior 166 to promote increased operational life of the flexible membrane 172.

In another embodiment, a cap 171 may be mounted to an external surface 173 of the mounting surface 167. The cap 171 further protects the flexible membrane 172. A second cap 175 may optionally be mounted to an interior surface 177 of the mounting surface 167 to protect the flexible membrane 172 from sharp edges that may exist inside the interior 166. Air may be communicated into gaps 181 formed between the cap 171 or the cap 175 and the flexible membrane 172.

Similar to the embodiment of FIGS. 4A and 4B, the flexible membrane 172 is movable to modify a volume of an interior 166 of the battery assembly 154. For example, the flexible membrane 172 may be positioned in a free state X, a first position X', a second position X", or any position between the first position X' and the second position X". The first position X' is toward the interior 166 to decrease the volume of the interior 166 when conditions drive a decrease in the internal pressure of the battery assembly 154, and the second position X" is away from the interior 166 to increase the volume of the interior 166 when conditions drive an increase in the internal pressure of the battery assembly 154. In this embodiment, the volume change may not be dependent on the flexible membrane 172 actually stretching. Instead, the flexible membrane 172 may include a constant surface area.

Figure 6:
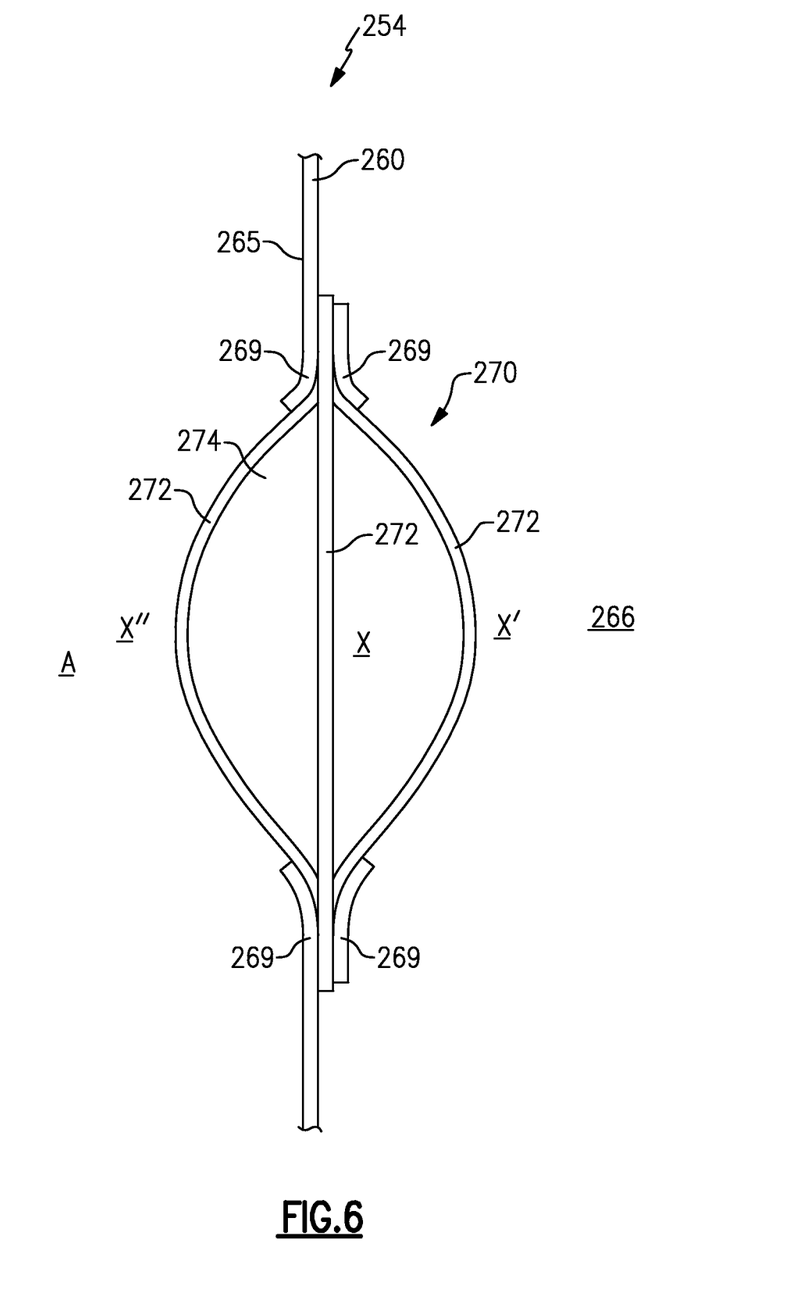
FIG. 6 illustrates a variable volume device according to another embodiment of this disclosure.

Another variable volume device 270 is illustrated by FIG. 6. In this embodiment, the variable volume device 270 of battery assembly 254 includes an elastomeric membrane 272 mounted within a window 274 of an enclosure assembly 260. The elastomeric membrane 272 may be trapped or pinched between opposing flanges 269 of a wall 265 of the enclosure assembly 260. The opposing flanges 269 establish a perimeter of the window 274.

The elastomeric membrane 272 may be made of any elastomeric material. In one non-limiting embodiment, the elastomeric membrane 272 is made of rubber. The material of the elastomeric membrane 272 may be selected based on the amount of stretch that is necessary to achieve a certain volumetric change inside the battery assembly 254.

The elastomeric membrane 272 is stretchable to balance a pressure differential between an interior 266 of the battery assembly 254 and surrounding atmosphere A. The elastomeric membrane 272 may normally be a flat diaphragm as represented by position X. The elastomeric membrane 272 may stretch toward a first position X' to decrease the volume of the interior 266, or toward a second position X" to increase the volume of the interior 266.

Figure 7:
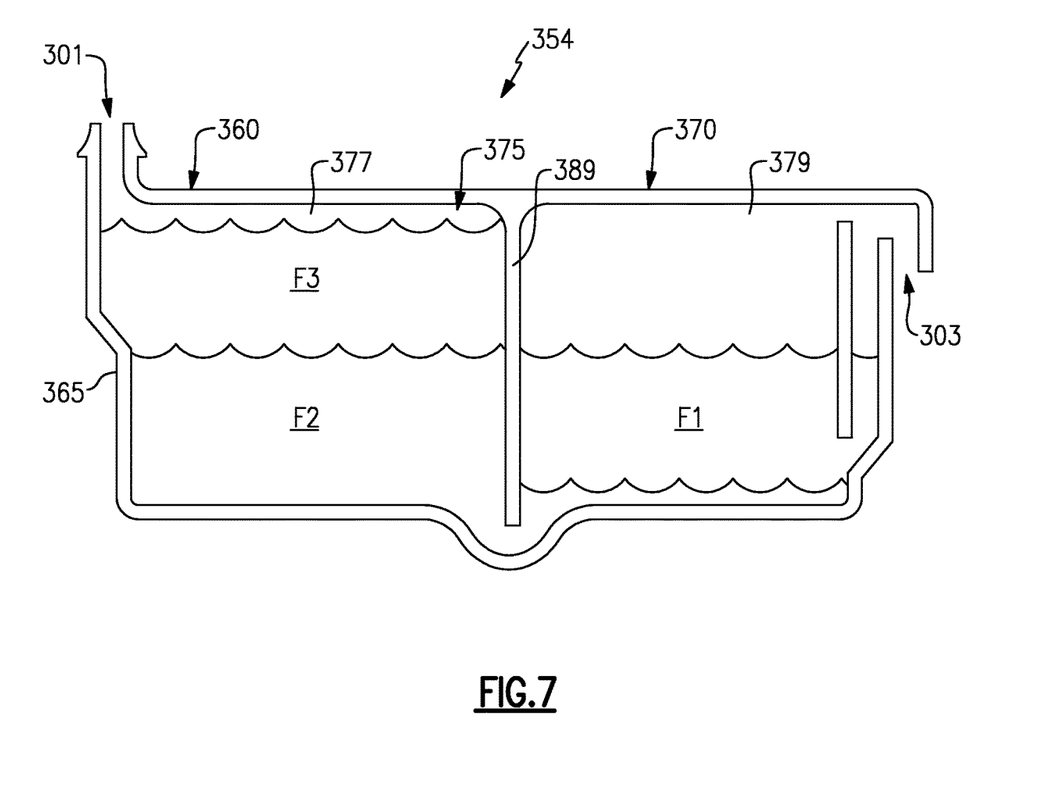
FIG. 7 illustrates a variable volume device according to yet another embodiment of this disclosure.

FIG. 7 illustrates yet another variable volume device 370 for a battery assembly 354. In this embodiment, the variable volume device 370 includes a liquid reservoir 375. The liquid reservoir 375 may be formed inside a wall 365 of an enclosure assembly 360 of the battery assembly 354. The variable volume device 370, including the liquid reservoir 375, is therefore considered integrated with the wall 365.

The liquid reservoir 375 may include a first chamber 377 and a second chamber 379 that are in fluid communication with one another. A divider 389 separates the first chamber 377 from the second chamber 379 inside the wall 365. The liquid reservoir 375 enables a volume change of the battery assembly 354. The volume change may be achieved by displacing fluid between the first chamber 377 and the second chamber 379. For example, a first position of the fluid can be a combination of a fluid level F1 and a fluid level F2 which form a level liquid amount. When the relative pressure inside the battery assembly 354 rises, it pushes the fluid towards the outside environment, increasing the battery internal volume and rebalancing the internal and external pressures. A second position of the fluid is represented by a combination of the fluid level F2 and a fluid level F3. If the relative pressure of the battery assembly 354 drops, the fluids can move in the opposite direction to decrease the volume of an interior 366 of the battery assembly 354.

In one embodiment, the first chamber 377 is exposed to the exterior atmosphere via opening 301 and the second chamber 379 is exposed to the air volume inside the battery assembly 354 via opening 303. The openings 301, 303 allow for the redistribution of the fluid between the first chamber 377 and the second chamber 379, and therefore allow for an adjustment of the volume of the interior of the battery assembly 354.

The liquid that makes up the fluid levels F1, F2 and F3 may be one that is not subject to freezing or evaporation throughout the operational environmental range. In one non-limiting embodiment, the fluid contained within the liquid reservoir 375 is a medium weight oil or other suitable substance.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
a sealed enclosure assembly defining an interior; and
a variable volume device configured to increase a volume of said interior in response to a pressure increase within said interior and configured to decrease said volume of said interior in response to a pressure decrease within said interior;
wherein said variable volume device is integrated inside a wall of said enclosure assembly as opposed to being positioned inside or outside of said interior,
wherein said variable volume device includes a liquid reservoir formed inside said wall of said enclosure assembly,
wherein said liquid reservoir contains a fluid that is displaceable between a first chamber and a second chamber of said liquid reservoir to modify said volume of said interior.

2. The battery assembly as recited in claim 1, wherein said interior accommodates a plurality of battery internal components.

3. The battery assembly as recited in claim 1, wherein said enclosure assembly includes a tray and a cover.

4. The battery assembly as recited in claim 3, wherein said wall is part of said tray and said variable volume device is integrated as part of said tray.

5. The battery assembly as recited in claim 3, wherein said wall is part of said cover and said variable volume device is integrated as part of said cover.

6. The battery assembly as recited in claim 1, comprising at least one battery array housed within said interior.

7. The battery assembly as recited in claim 1, wherein the battery assembly is mounted within an electrified vehicle.

8. A method, comprising:
balancing a pressure differential between an interior of a battery assembly of an electrified vehicle and atmosphere external to the battery assembly with a variable volume device that is integrated as part of a sealed enclosure assembly of the battery assembly, the variable volume device adapted to decrease a volume of the interior in response to a pressure decrease within the interior, wherein the variable volume device is integrated inside a wall of the enclosure assembly as opposed to being positioned inside or outside of the interior,
wherein the variable volume device includes a liquid reservoir formed inside the wall of the enclosure assembly and the method further comprises:
displacing a fluid between a first chamber and a second chamber of the liquid reservoir to modify the volume of the interior.

9. A battery assembly, comprising:
an enclosure assembly establishing an interior; and
a variable volume device including a liquid reservoir formed inside a wall of said enclosure assembly and configured to modify a volume of said interior solely by displacing a fluid between a first chamber and a second chamber of the liquid reservoir.

\* \* \* \* \*